(12) United States Patent
Nanbu et al.

(10) Patent No.: US 12,553,495 B2
(45) Date of Patent: Feb. 17, 2026

(54) CORD STOPPER

(71) Applicant: YKK Corporation, Tokyo (JP)

(72) Inventors: Madoka Nanbu, Toyama (JP); Yohei Shimizu, Tokyo (JP)

(73) Assignee: YKK Corporation, Tokyo (JP)

( * ) Notice: Subject to any disclaimer, the term of this patent is extended or adjusted under 35 U.S.C. 154(b) by 0 days.

(21) Appl. No.: 18/682,169

(22) PCT Filed: Aug. 10, 2021

(86) PCT No.: PCT/JP2021/029528
§ 371 (c)(1),
(2) Date: Feb. 8, 2024

(87) PCT Pub. No.: WO2023/017566
PCT Pub. Date: Feb. 16, 2023

(65) Prior Publication Data
US 2024/0344592 A1    Oct. 17, 2024

(51) Int. Cl.
*F16G 11/04*   (2006.01)
*A44B 99/00*   (2010.01)

(52) U.S. Cl.
CPC ............ *F16G 11/044* (2013.01); *A44B 99/00* (2013.01)

(58) Field of Classification Search
CPC . A43C 7/00; A43C 7/08; F16G 11/044; F16G 11/101; F16G 11/106; A44B 99/00; Y10T 24/3713; Y10T 24/3969
See application file for complete search history.

(56) References Cited

U.S. PATENT DOCUMENTS

| | | | | |
|---|---|---|---|---|
| 4,878,269 A | * | 11/1989 | Anscher | F16G 11/101 24/136 R |
| 5,435,044 A | * | 7/1995 | Ida | F16G 11/106 24/136 L |
| 5,894,639 A | * | 4/1999 | Boden | F16G 11/106 24/115 M |

(Continued)

FOREIGN PATENT DOCUMENTS

| | | |
|---|---|---|
| EP | 2607747 A2 | 6/2013 |
| JP | H11-309001 A | 11/1999 |

(Continued)

OTHER PUBLICATIONS

International Search Report, PCT Patent Application No. PCT/JP2021/029528, Nov. 2, 2021, 5 pages.

(Continued)

*Primary Examiner* — Jason W San
*Assistant Examiner* — Loius A Mercado
(74) *Attorney, Agent, or Firm* — Kilpatrick Townsend & Stockton LLP

(57) ABSTRACT

A cord stopper includes: a socket; and a plug. The plug is provided with a holding portion, a pair of guide portions, and a pair of operation portions that are plate bodies being continuous with tip ends of the guide portions and have surfaces parallel to the protrusion direction of the holding portion. When the plug is moved toward an insertion through port, a string is clamped and fixed between an inner wall surface of the socket and the plug. When the plug is moved away from the insertion through port, a space between the inner wall surface of the socket and the plug is widened, and the string is slidable.

9 Claims, 13 Drawing Sheets

(56) References Cited

U.S. PATENT DOCUMENTS

| | | | |
|---|---|---|---|
| 6,185,798 B1 | 2/2001 | Ton | |
| 10,718,404 B2* | 7/2020 | Shimizu | F16G 11/106 |
| 11,026,472 B2* | 6/2021 | Dyer | A43B 3/00 |
| 11,199,244 B2* | 12/2021 | Nanbu | F16G 11/10 |
| 11,725,712 B2* | 8/2023 | Piao | A44B 99/00 24/115 G |
| 2018/0153262 A1 | 6/2018 | Shimizu | |
| 2019/0078646 A1 | 3/2019 | Shimizu et al. | |
| 2021/0088107 A1 | 3/2021 | Nanbu et al. | |
| 2023/0140509 A1* | 5/2023 | Lee | A43C 11/20 24/712.1 |

FOREIGN PATENT DOCUMENTS

| | | | |
|---|---|---|---|
| JP | 2001-340111 A | 12/2001 | |
| JP | 2018-089199 A | 6/2018 | |
| JP | 2019-047949 A | 3/2019 | |
| JP | 2019-198414 A | 11/2019 | |

OTHER PUBLICATIONS

Written Opinion, PCT Patent Application No. PCT/JP2021/029528, Nov. 2, 2021, 3 pages.
International Preliminary Report on Patentability, PCT Patent Application No. PCT/JP2021/029528, Feb. 13, 2024, pages.

\* cited by examiner

CORD STOPPER

TECHNICAL FIELD

The present invention relates to a cord stopper through which a string is inserted and fixed at any position of the string.

BACKGROUND ART

In the related art, there is a cord stopper that is attached at any position of a string and adjusts an extension length of the string to hold the string at a predetermined length. Such a string stopper has various shapes, for example, a cord lock of Patent Literature 1 includes a hollow holder body and a fastening member that is movable relative to the holder body and holds a string inserted into the holder body. The fastening member is provided with a tooth portion at a center, and a plurality of saw teeth-like inclined teeth are formed on both sides of the tooth portion. A direction of inclination of the saw teeth is opposite to a direction in which the string inserted into the holder body moves so as to be loosened. In other words, the tooth portion has a shape that allows the string to move only in a tightening direction when the fastening member is in a fastened state. A guide portion that is inserted into a guide passage of the holder body is provided above the tooth portion in the direction of inclination. A finger hook for easily hooking a finger during movement of the fastening member is formed to protrude above the guide portion.

CITATION LIST

Patent Literature

Patent Literature 1: JPH11-309001A

SUMMARY OF INVENTION

Technical Problem

In the case of the above-described background art, when the string is tightened, it is necessary to operate the finger hook to move the fastening member in a direction in which the string is moved and to switch from a locked state in which the string is locked to a released state in which the string is movable. Therefore, two operations, that is, an operation of moving the fastening member to switch to the released state and an operation of moving the holder body with respect to the string are performed, and the operation is complicated. Furthermore, the string stopper is formed of three members of the holder body, the fastening member, and an end cover, has many components, each of which is formed with the finger hook that protrudes upward, and has a complicated shape. The fastening member is structurally provided with a long tooth portion in one direction, the holder body requires a sufficient length to accommodate the tooth portion, and the end cover is attached to an end portion of the holder body, and thus a problem that appearance becomes large also exists.

The present invention is made in view of the above problems of the related art, and an object of the present invention is to provide a cord stopper that has a small size and a simple shape and is easily used by a simple operation.

Solution to Problem

The present invention is a cord stopper. The cord stopper includes: a socket in which a fitting portion through which a string is to be inserted, is provided; and a plug configured to press and hold the string inserted into the socket against an inner wall surface of the socket. The socket is a cylindrical body surrounded by a pair of surface portions facing each other at a predetermined interval and a pair of side surface portions positioned at respective side edges of the pair of surface portions and facing each other, and which is provided with the fitting portion, one of a pair of opposing opening portions of the cylindrical body is an insertion port into which the plug is to be inserted and attached and through which the string is to be inserted, and another opening portion is an insertion through port through which the string is to be inserted, together with the insertion port. The surface portion is provided with a slide groove portion whose one end portion communicates with the insertion port and another end portion is positioned on a side of the insertion through port, an inner surface of the surface portion is provided with a guide concave portion whose one end portion is positioned on the side of the insertion through port and extends toward the slide groove portion and another end portion reaches near an end portion of the slide groove portion, and a portion between the end portion of the slide groove portion and the end portion of the guide concave portion is configured to serve as a stopper. The plug is provided with a holding portion that protrudes in an insertion direction of the string within the fitting portion, a pair of guide portions that are positioned at a base end portion of the holding portion, intersect a protrusion direction of the holding portion, and protrude toward the pair of surface portions, respectively, and a pair of operation portions that are plate bodies being continuous with tip ends of the guide portions and have surfaces parallel to the protrusion direction of the holding portion. When the socket and the plug are assembled, the operation portion is positioned inside an outline of the surface portion. The plug is provided with a holding convex portion configured to fit and slide in the guide concave portion at a tip end portion of the holding portion opposite to the base end portion, the holding convex portion is slidable between the stopper and the insertion through port along the guide concave portion, and the guide portion is provided to be movable by fitting into the slide groove portion. In the cord stopper, when the plug is moved toward the insertion through port, the string is clamped and fixed between the inner wall surface of the socket and the plug, and when the plug is moved away from the insertion through port, a space between the inner wall surface of the socket and the plug is widened, and the string is slidable.

In a state where the string is inserted into the socket and the plug is assembled, a projection shape of the operation portion on the surface portion is positioned inside the outline of the surface portion at any position in a direction in which the plug is slidable.

A portion of the surface portion of the socket between the stopper of the end portion of the slide groove portion and the insertion through port is a finger place portion on which a finger is placed during operation. The finger place portion includes a socket finger hook portion that protrudes from a side edge portion of the surface portion along the insertion through port.

The guide concave portion on an inner surface of the finger place portion has a projection shape in a thickness direction of the surface portion, which at least partially overlaps with the holding portion of the plug.

The finger place portion is provided at a ratio of 0.3 to 0.5 with respect to a length of the socket on the insertion direction of the string. In a state where the string is inserted into the socket and the plug is assembled, the finger place portion of the socket is exposed from the operation portion at a ratio of 0.2 to 0.4 with respect to the length of the socket in the insertion direction of the string even when the plug is moved to any position at which the plug is slidable.

In the socket, a socket finger hook portion protruding from the surface is formed on the side edge portion of the surface portion along the insertion through port. Furthermore, the operation portion of the plug may have an operation finger hook portion formed at an end portion opposite to the protrusion direction of the holding portion.

One of the surface portions of the socket, which forms the insertion through port, may be provided with a tape attachment portion.

Advantageous Effects of Invention

The cord stopper of the present invention has a small size and a simple shape and is easily used by a simple operation. In an operation of opening and closing an opening portion of a bag or the like, the socket and the plug can be held together by one hand, it is not necessary to switch between the time of opening and the time of closing or to separately hold the socket and the plug, an intuitive operation is possible, and the operation is easy.

DESCRIPTION OF EMBODIMENTS

Figure 1:
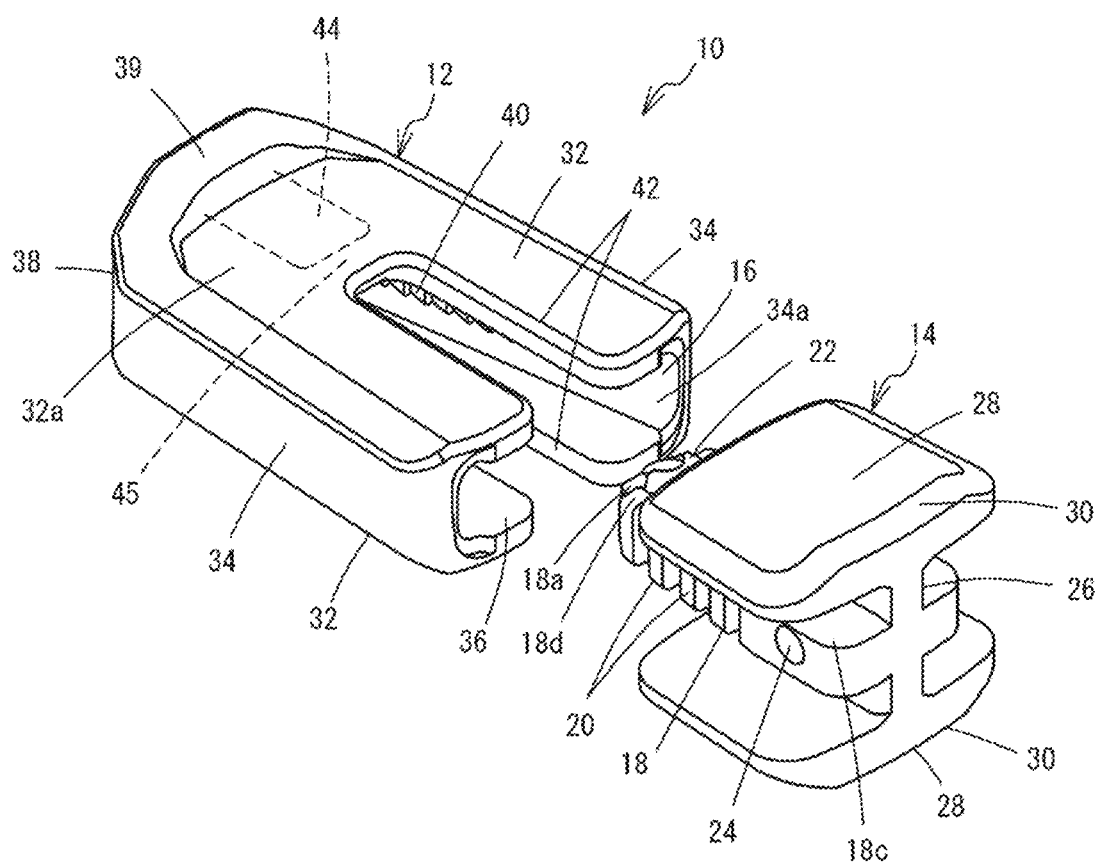
FIG. 1 is an exploded perspective view of a cord stopper according to a first embodiment of the present invention, as viewed from a plug side.
Figure 1:
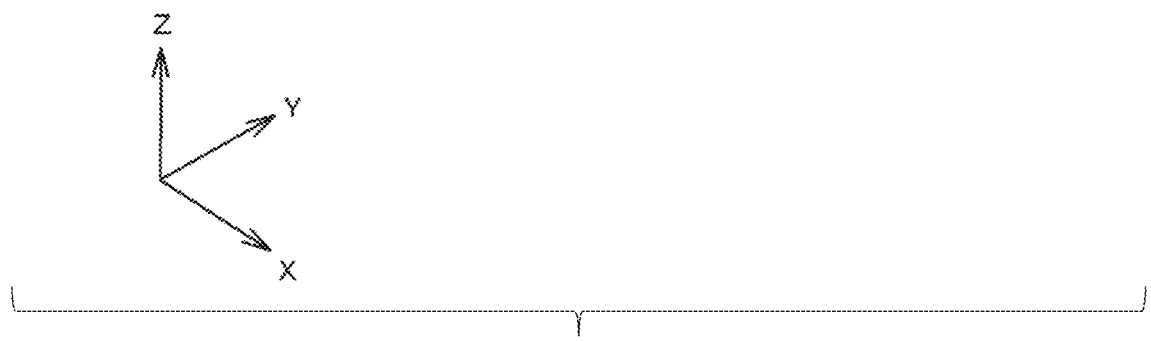
Figure 2:
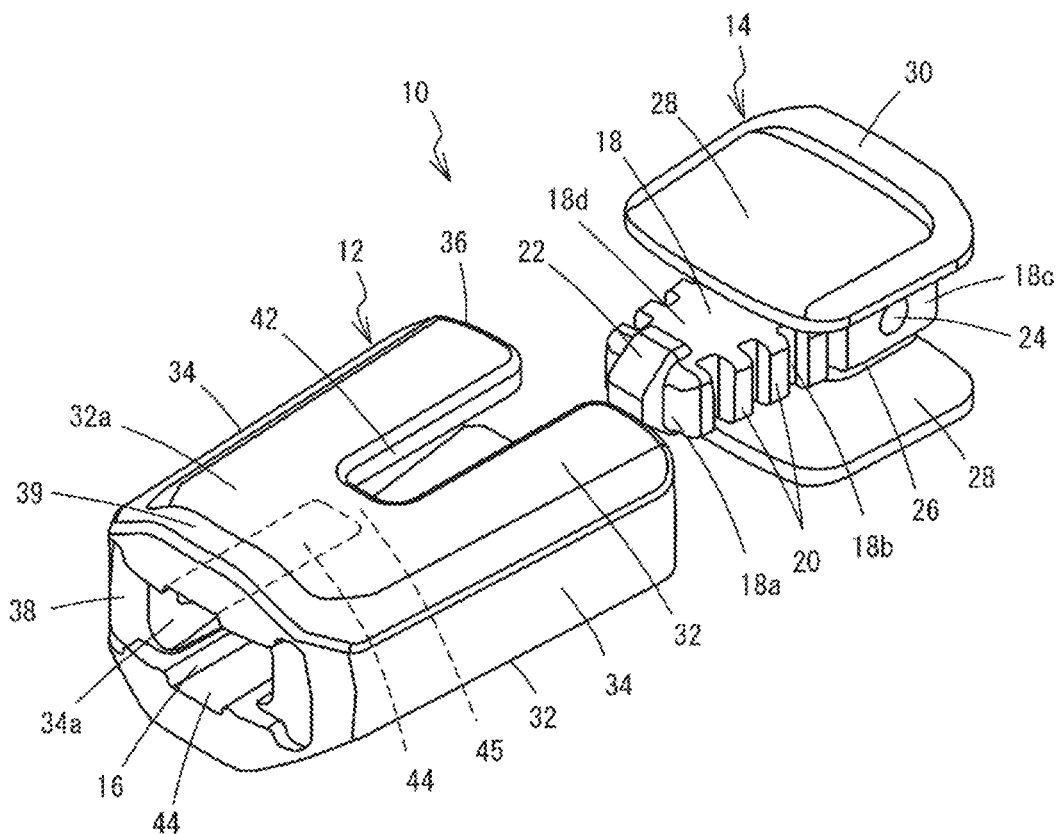
FIG. 2 is an exploded perspective view of the cord stopper according to the first embodiment of the present invention, as viewed from a socket side.
Figure 2:
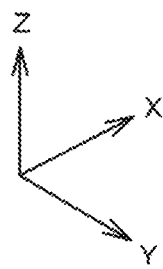

Hereinafter, embodiments of the present invention will be described with reference to the drawings. FIGS. 1 to 9D show a first embodiment of the present embodiment. A cord stopper 10 according to the present embodiment is formed of a socket 12 in which a fitting portion 16 through which a string 46, which will be described later, is inserted in one direction is provided inside, and a plug 14 that is inserted into and locked to the fitting portion 16 and presses and holds the string 46 against the socket 12. In the following description, a front-rear direction in which a holding portion 18 of the plug 14 protrudes is defined as an X-axis direction of XYZ axes, which are orthogonal to one another, and coincides with an insertion direction of the string 46. A left-right direction orthogonal to the X-axis direction is defined as a Y-axis direction, and a front-back direction or thickness direction orthogonal to the X-axis direction and the Y-axis direction is defined as a Z-axis direction.

First, the plug 14 will be described. The plug 14 is integrally molded from a synthetic resin such as polypropylene. As shown in FIGS. 9A to 9D, the plug 14 is provided with the holding portion 18 inserted into the socket 12.

The holding portion 18 has a rectangular cross-sectional shape orthogonal to the protrusion direction of the holding portion 18, that is, the X-axis direction, and has a rectangular cross-section that is long in the Y-axis direction and short in the Z-axis direction, which is the front-back direction. The holding portion 18 has a wedge-shaped contour on a plane parallel to the X-axis direction, and a cross-sectional shape orthogonal to the X-axis direction becomes smaller as approaching a tip end portion 18a in the protrusion direction. A pair of side surfaces 18b of the holding portion 18, which are orthogonal to the Y-axis direction, are each provided with clamping protrusions 20 at approximately a half close to the tip end portion 18a. The clamping protrusions 20 are a plurality of protrusions along the Z-axis direction, protrude in the left-right direction which is the Y-axis direction, and have a rectangular cross-sectional shape along an XZ plane direction of protruding end portions.

The tip end portion 18a of the holding portion 18 is provided with a holding convex portion 22. The holding convex portion 22 is continuously formed on the tip end portion 18a of the holding portion 18 and a pair of upper surfaces 18d. The holding portion 18 has a trapezoidal wedge-shaped cross-sectional shape orthogonal to the Z-axis direction, a portion of which protrudes from the upper surface 18d in the Z-axis direction to form the holding convex portion 22. A protrusion amount of the holding convex portion 22 protruding from the upper surface 18d in the Z-axis direction is smaller than a protrusion amount of the guide portion 26 described later.

A base end portion 18c opposite to the tip end portion 18a is continuously formed in a plate shape having side surfaces that are flush with the pair of upper surfaces 18d of the holding portion 18 and each end surface of the clamping protrusions 20. The base end portion 18c is shorter than a length of the clamping protrusion 20, and a hole 24 of a predetermined depth is formed in a pair of side surface portions orthogonal to the Y-axis direction to reduce weight.

On a pair of surfaces of the base end portion 18c of the holding portion 18 that are orthogonal to the Z-axis direction, guide portions 26 that respectively protrude in the Z-axis direction are provided. The guide portion 26 is provided at a center of the base end portion 18c of the holding portion 18 and is elongated in the X-axis direction passing through the center of the base end portion 18c. The base end portion 18c of the holding portion 18 and an end portion of the guide portion 26 on the opposite side to the protrusion direction of the holding portion 18 coincide with each other.

An operation portion 28 is provided at each tip end of the pair of guide portions 26 in the Z-axis direction. The operation portion 28 is a plate body having a plane parallel to an XY plane and is a rectangle having a width longer than the base end portion 18c of the holding portion 18 in the Y-axis direction and longer than the base end portion 18c in the X-axis direction. A thickness of each operation portion 28 in the Z-axis direction is smaller than that of the holding portion 18. An end portion of the operation portion 28 on the opposite side to the protrusion direction of the holding portion 18 coincides with the base end portion 18c of the holding portion 18 and the end portion of the guide portion 26, on which an operation finger hook portion 30, which is a protrusion protruding from each surface, is formed in the Z-axis direction. The operation finger hook portion 30 is formed along the end portion of the operation portion 28. When the socket 12 and the plug 14 are assembled, the operation finger hook portion 30 is positioned on an opposite side of the socket 12 from the insertion through port 38 which will be described later. As a result, the guide portions 26 and the operation portions 28 having the same shape are provided on both sides of the holding portion 18 in the Z-axis direction, and the pair of operation portions 28 overlap with the clamping protrusions 20 of the holding portion 18 in the Z-axis direction. That is, the plug 14 is formed shorter in the X-axis direction than a sum of respective lengths of the holding portion 18 and the operation portion 28. The plug 14 is symmetrical about a central axis in the X-axis direction.

Figure 5:
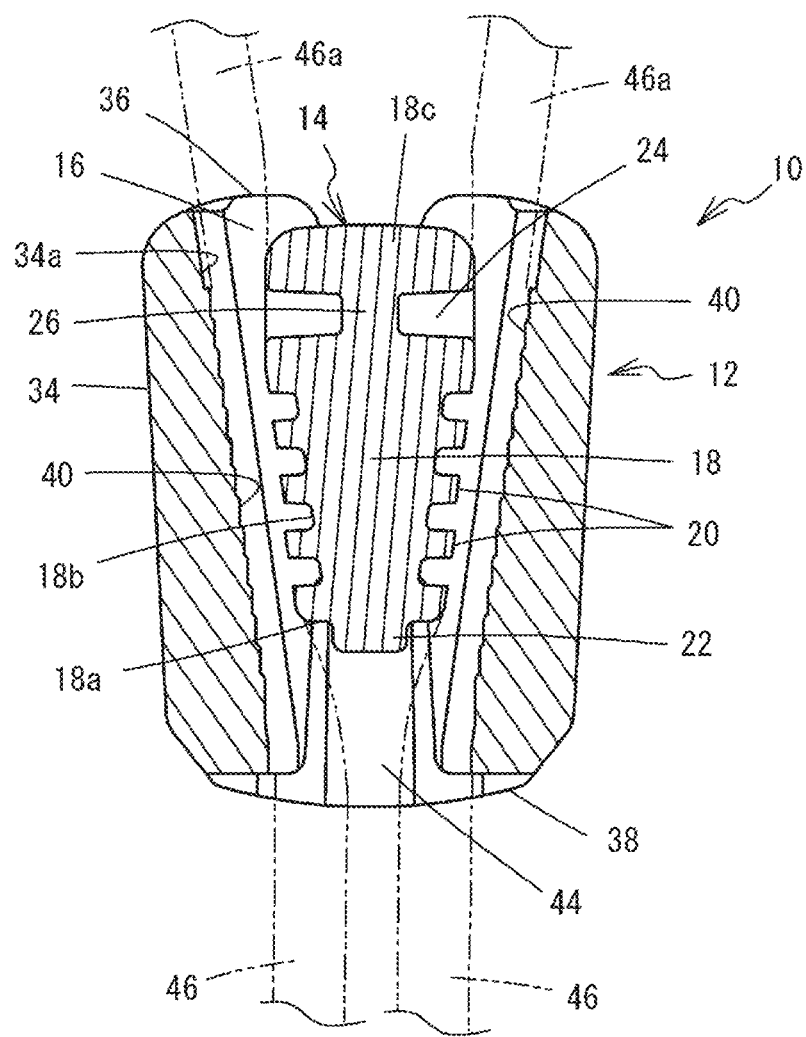
FIG. 5 is a longitudinal cross-sectional view taken along line A-A of FIG. 4B.
Figure 6:
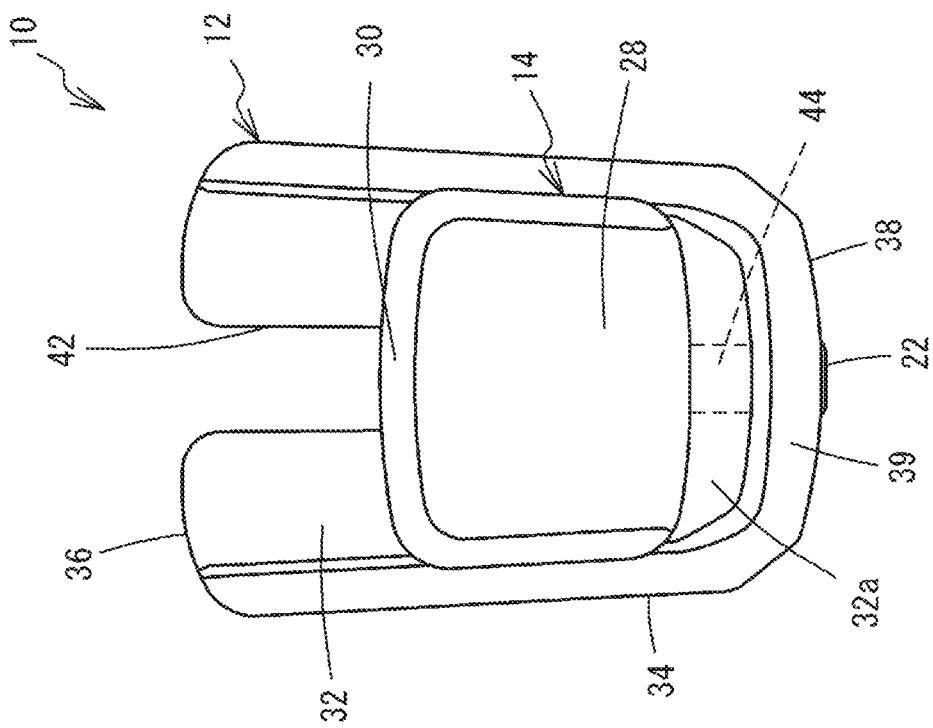
FIG. 6 is a longitudinal cross-sectional view taken along line B-B of FIG. 4C.
Figure 7:
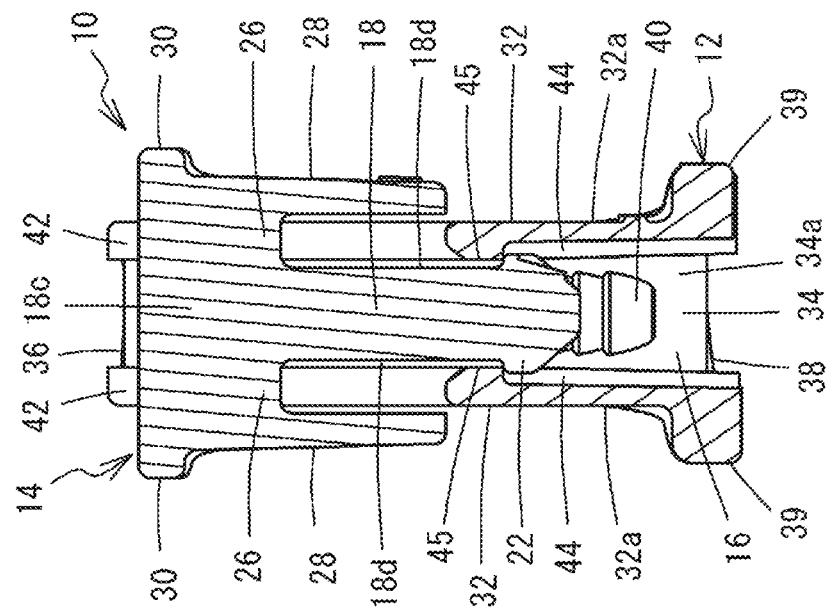
FIG. 7 is a front view showing a state in which the plug of the cord stopper according to the first embodiment of the present invention enters in an insertion direction from the insertion through port of the socket.
Figure 8A:
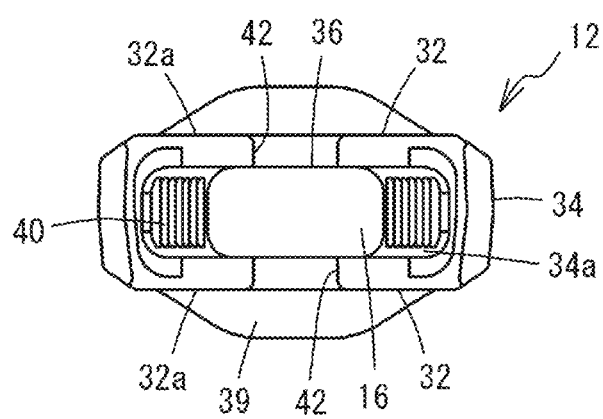
FIG. 8A is a plan view of the socket of the cord stopper according to the first embodiment of the present invention.
Figure 8B:
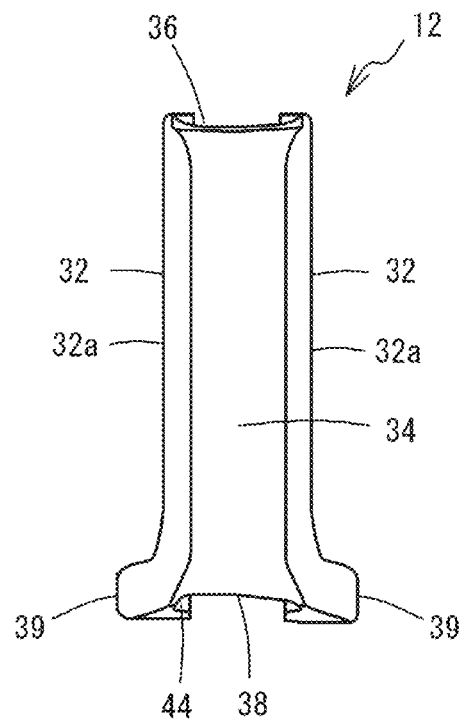
FIG. 8B is a left side view of the socket of the cord stopper according to the first embodiment of the present invention.
Figure 8C:
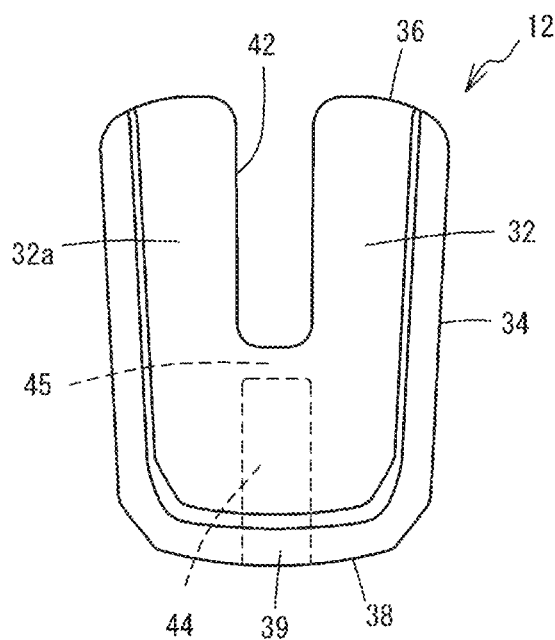
FIG. 8C is a front view of the socket of the cord stopper according to the first embodiment of the present invention.
Figure 8D:
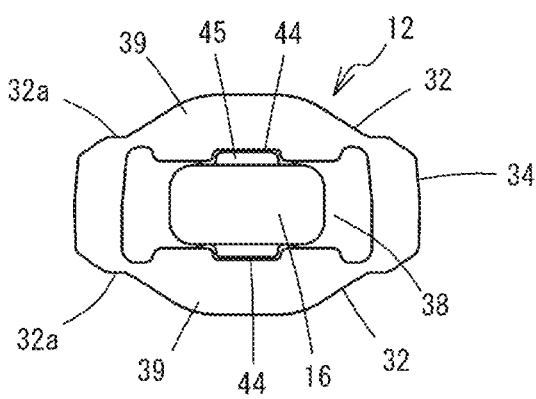
FIG. 8D is a bottom view of the socket of the cord stopper according to the first embodiment of the present invention.
Figure 9A:
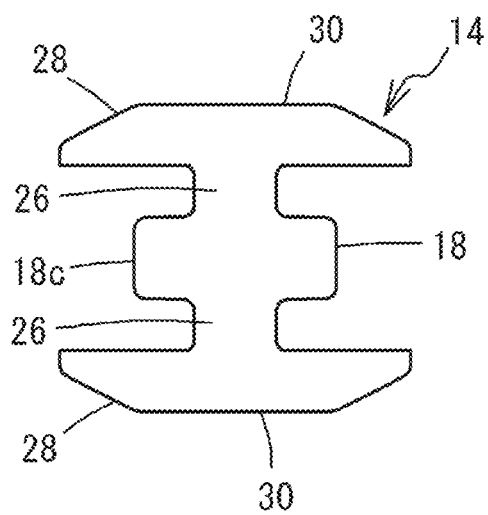
FIG. 9A is a plan view of the plug of the cord stopper according to the first embodiment of the present invention.
Figure 9B:
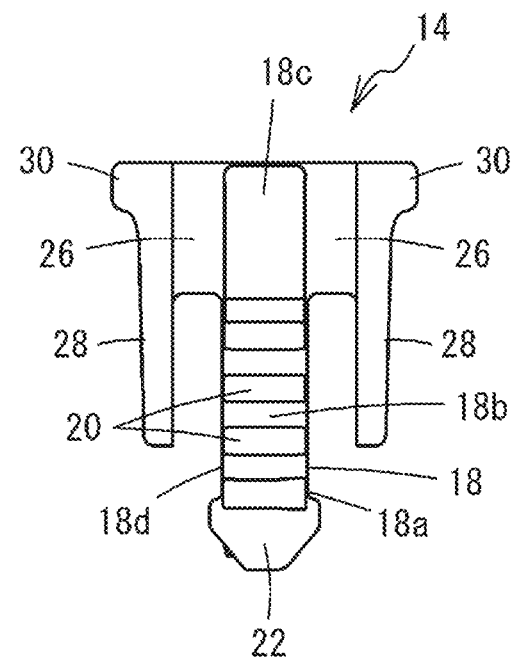
FIG. 9B is a left side view of the plug of the cord stopper according to the first embodiment of the present invention.
Figure 9C:
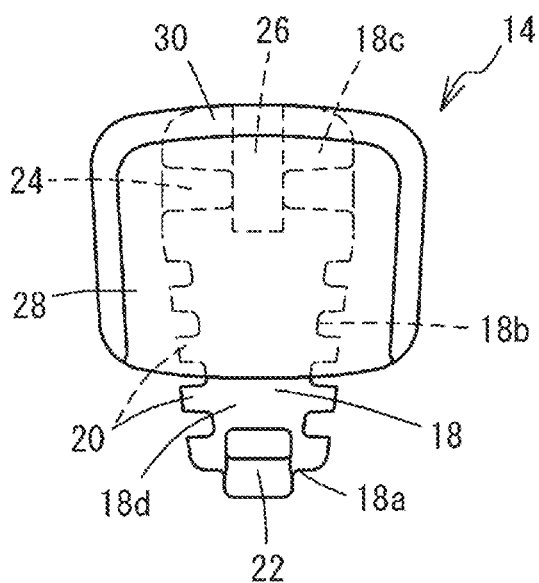
FIG. 9C is a front view of the plug of the cord stopper according to the first embodiment of the present invention.
Figure 9D:
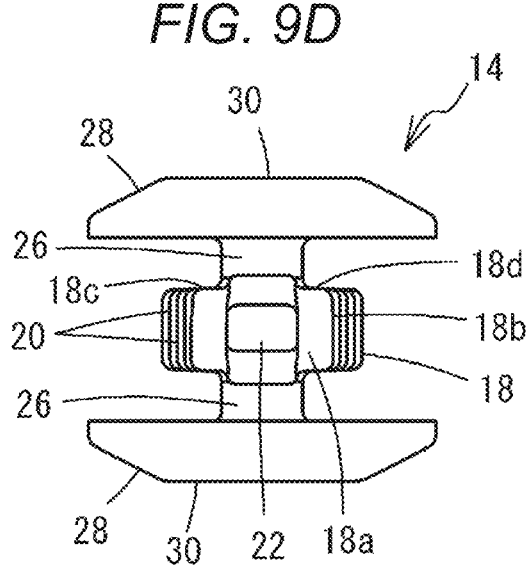
FIG. 9D is a bottom view of the plug of the cord stopper according to the first embodiment of the present invention.
Figure 10:
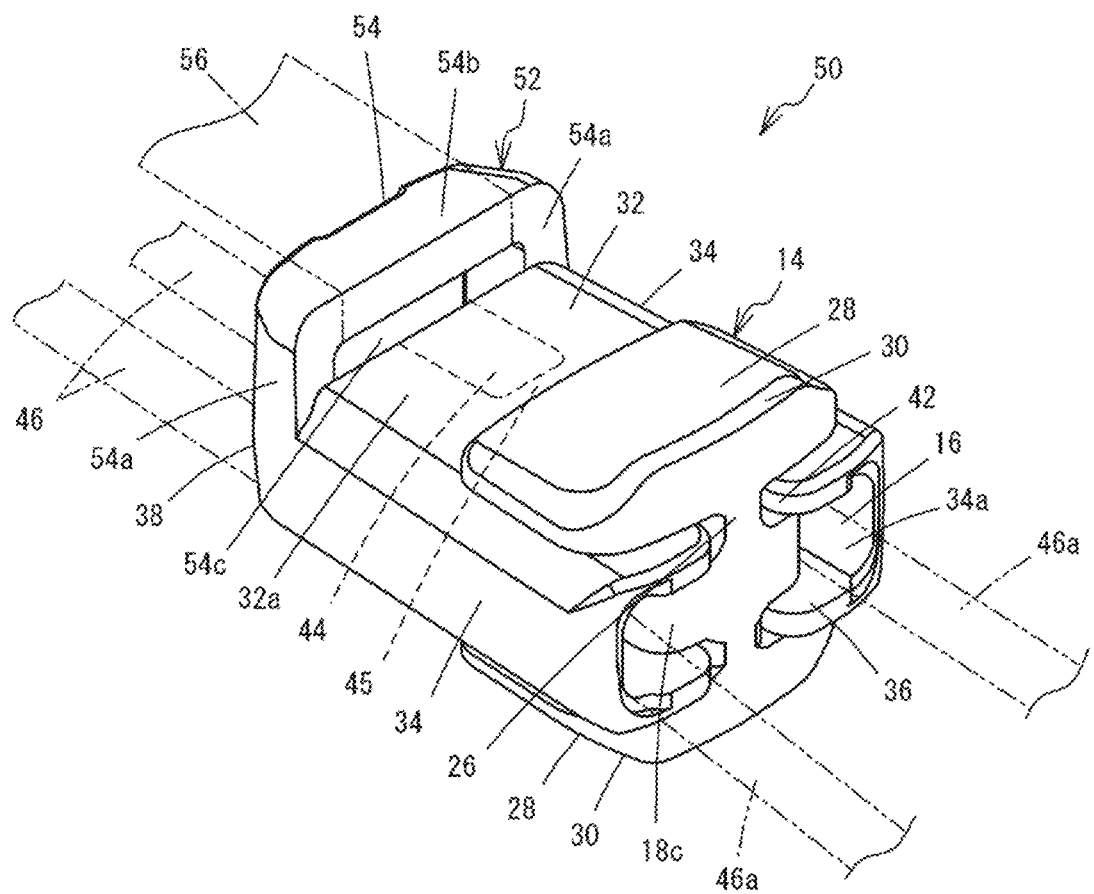
FIG. 10 is a perspective view of a cord stopper according to a second embodiment of the present invention.
Figure 11A:
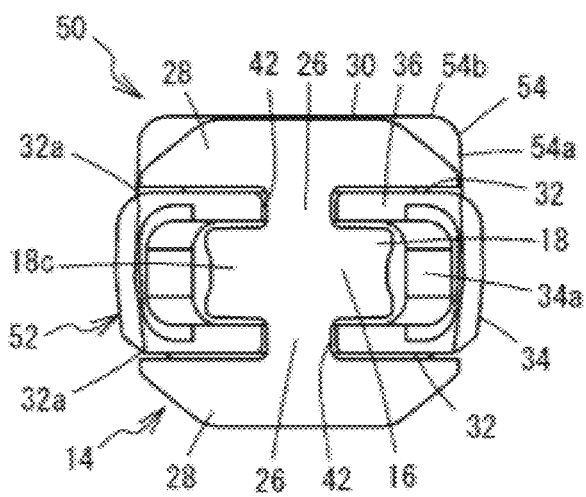
FIG. 11A is a plan view of the cord stopper according to the second embodiment of the present invention.
Figure 11B:
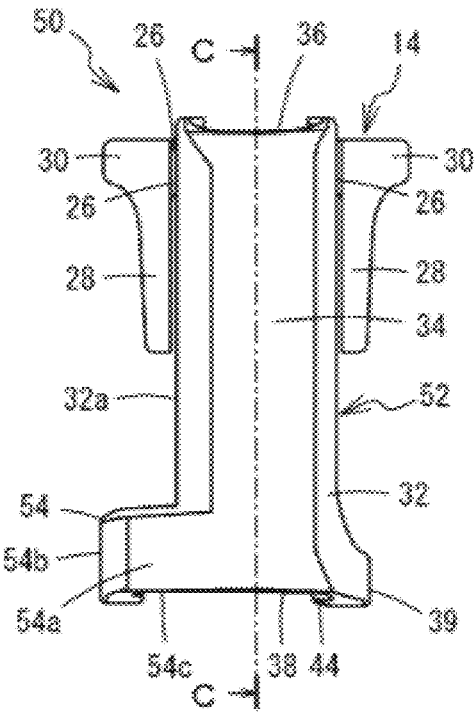
FIG. 11B is a left side view of the cord stopper according to the second embodiment of the present invention.
Figure 11C:
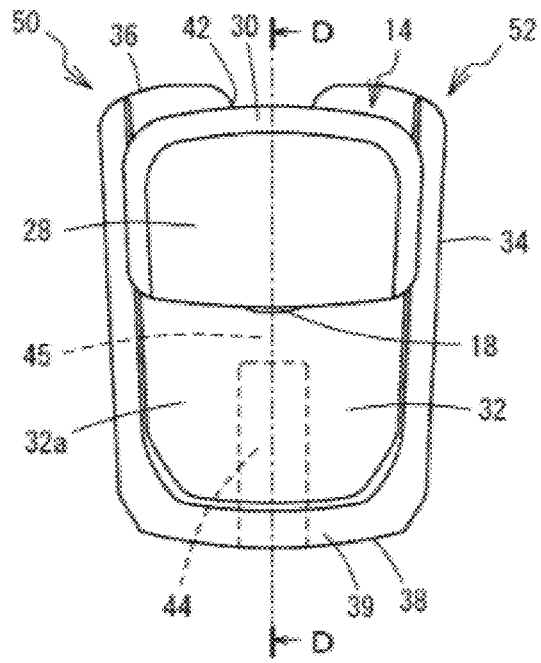
FIG. 11C is a front view of the cord stopper according to the second embodiment of the present invention.
Figure 11D:
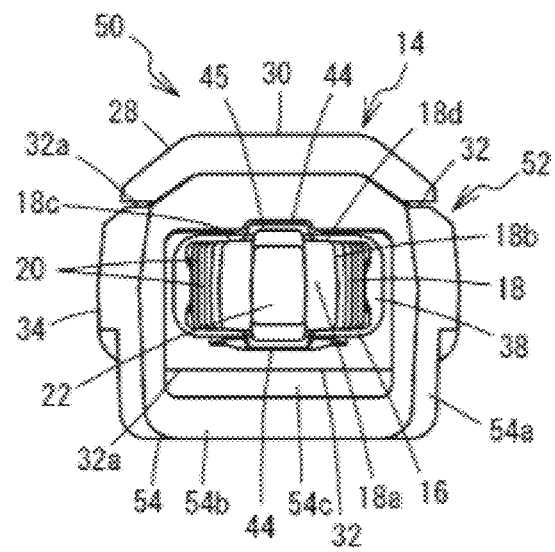
FIG. 11D is a bottom view of the cord stopper according to the second embodiment of the present invention.

Next, the socket 12 will be described. The socket 12 is integrally formed from a synthetic resin such as polypropylene. As shown in FIGS. 8A and 8D, the socket 12 has a hollow fitting portion 16 into which the plug 14 is inserted. The fitting portion 16 is surrounded by a pair of surface portions 32 having the same shape and facing each other at a predetermined interval and orthogonal to the Z-axis direction and a pair of side surface portions 34 having the same shape, positioned at side edges of the pair of surface portions 32, and facing each other, and is formed into a cylindrical body. As shown in FIG. 5, the fitting portion 16 is a space into which the plug 14 is fitted with some clearance and has a gap between the plug 14 and the fitting portion 16 in which a string 46, which will be described later, is clamped therebetween. The insertion direction of the string 46 in the fitting portion 16 is the X-axis direction in which the plug 14 is inserted into the socket 12.

One opening portion of the cylindrical body of the socket 12 is the insertion port 36 into which the plug 14 is inserted and through which the string 46 is inserted, and the opposite opening portion is the insertion through port 38 which holds the string 46, against which the plug 14 is pressed, and through which the held string 46 is inserted. A thickness of the surface portion 32 in the Z-axis direction is approximately constant, and a thickness of the side surface portion 34 [22] in the Y-axis direction is formed to gradually increase from an insertion port 36 side to an insertion through port 38 side. Accordingly, an interval between inner wall surfaces 34a of the side surface portions 34 gradually narrows from the insertion port 36 to the insertion through port 38. A width of the insertion port 36 in the Y-axis direction is formed larger than a width of the insertion through port 38 in the Y-axis direction, and widths of the insertion port 36 and the insertion through port 38 in the Z-axis direction are approximately the same. A plurality of uneven portions 40 are provided on the inner wall surface 34a of the side surface portion 34. The uneven portions 40 are protrusions provided in the Z-axis direction and are arranged at equal intervals in the X-axis direction. A top portion of the protrusion is triangular and protrudes toward the insertion port 36.

Each surface portion 32 is provided with a rectangular slide groove portion 42. The slide groove portion 42 has a rectangular shape elongated in the X-axis direction and has one end portion communicating with the insertion port 36 and the other end portion reaching a position slightly closer to the insertion through port 38 than the intermediate portion of the length of the surface portion 32 in the X-axis direction. A portion of each surface portion 32 between an end portion of the slide groove portion 42 and the insertion through port 38 serves as a finger place portion 32a on which a finger is placed during operation.

The finger place portion 32a is provided at a ratio of the length in the X-axis direction of 0.3 to 0.5 with respect to the length of the socket 12 in the X-axis direction. On the inner wall surface of each surface portion 32, a guide concave portion 44 having a shape obtained by cutting the thickness of the surface portion 32 into a rectangular shape is provided on a back side of the finger place portion 32a. The guide concave portion 44 has a rectangular shape elongated in the X-axis direction and has one end portion in the X-axis direction communicating with the insertion through port 38 and the other end portion reaching a position slightly away from the end portion of the slide groove portion 42. The slide groove portion 42 and the guide concave portion 44 pass through the intermediate portion of a width of the surface portion 32 in the Y-axis direction. The end portion of the slide groove portion 42 and an end portion of the guide concave portion 44 are provided slightly apart from each other, and a portion between the end portion of the slide groove portion 42 and the end portion of the guide concave portion 44 serves as a stopper 45 for the plug 14, which moves in the fitting portion 16.

A socket finger hook portion 39 that protrudes in the Z-axis direction is formed on a side edge portion along the insertion through port 38 of the finger place portion 32a of the surface portion 32. The socket 12 is also symmetrical about the central axis in the X-axis direction.

Next, a locking operation of the cord stopper 10 according to the present embodiment will be described. First, the cord stopper 10 is used by being attached near an opening portion of a bag (not shown) or the like. One string 46 is inserted through the opening portion along a peripheral edge portion, and the opening portion is opened and closed by changing a length at which both end portions 46a of the one string 46 are pulled out from a hole or the like for passing the string through.

Figure 3:
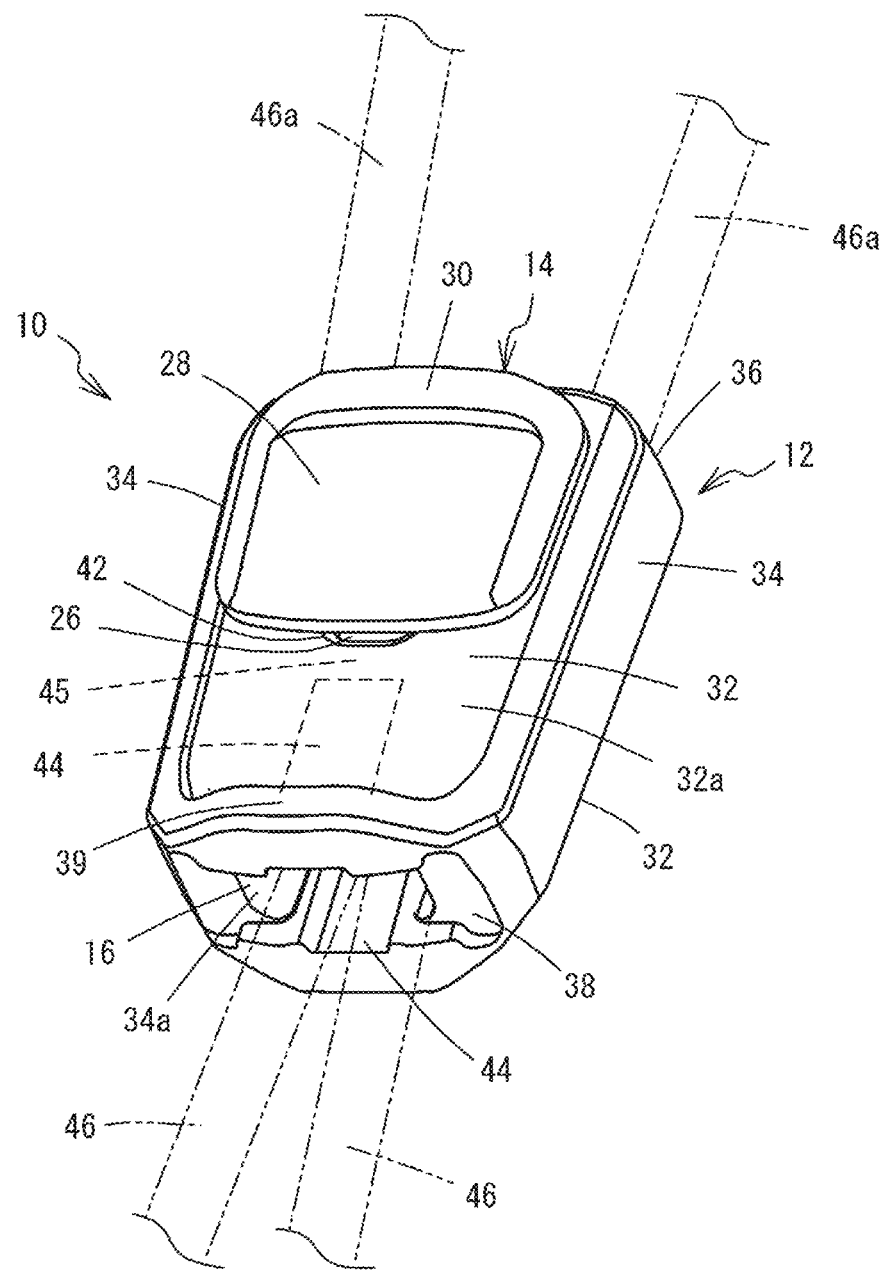
FIG. 3 is a perspective view of the cord stopper according to the first embodiment of the present invention.
Figure 3:
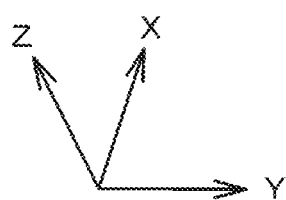
Figure 4A:
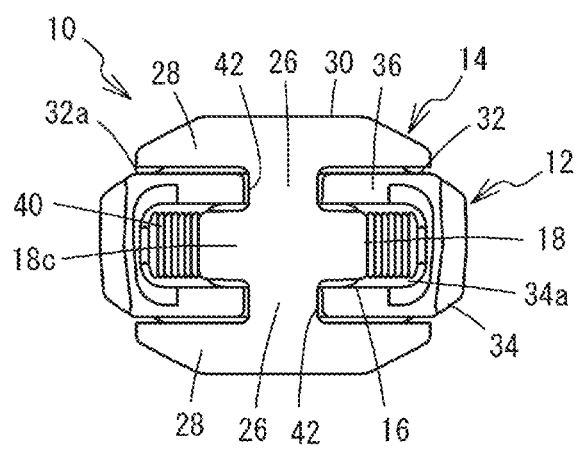
FIG. 4A is a plan view of the cord stopper according to the first embodiment of the present invention.
Figure 4B:
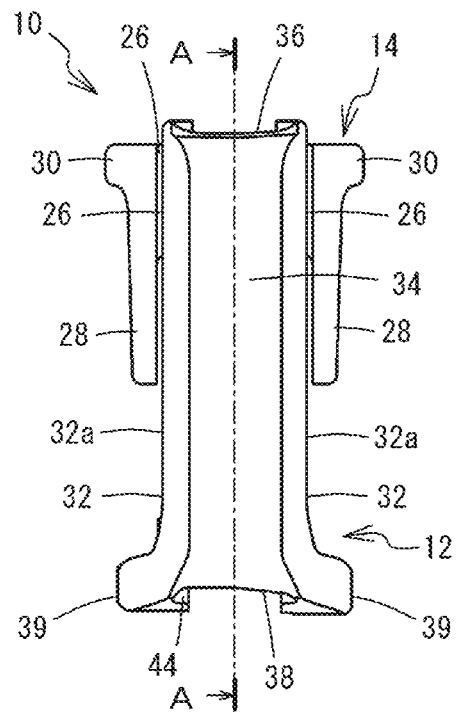
FIG. 4B is a left side view of the cord stopper according to the first embodiment of the present invention.
Figure 4C:
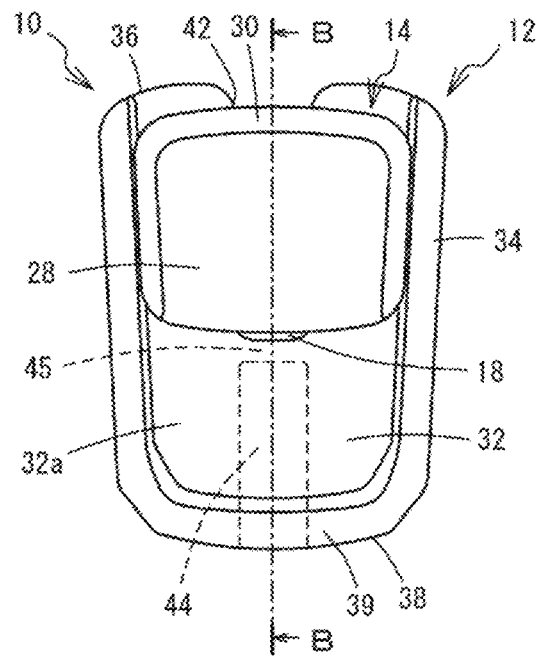
FIG. 4C is a front view of the cord stopper according to the first embodiment of the present invention.
Figure 4D:
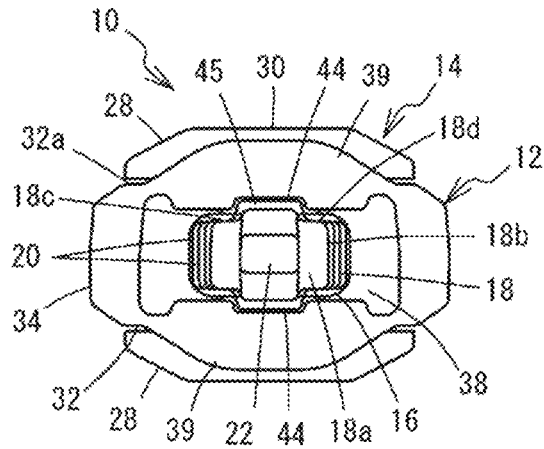
FIG. 4D is a bottom view of the cord stopper according to the first embodiment of the present invention.

As shown in FIGS. 3 and 5, in a method of attaching the cord stopper 10 to an object to be attached such as a bag, first, before the plug 14 is assembled, in the socket 12, both end portions 46a of the string 46 pulled out from the hole or the like for passing the string through of a bag (not shown) or the like are inserted into the fitting portion 16 from the insertion through port 38 and pulled out to the outside from the insertion port 36. Both end portions 46a of a pair of strings 46 are brought close to both ends of the insertion port 36 in the Y-axis direction, and the plug 14 is inserted between the pair of strings 46 at a center of the insertion port 36 with a tip end portion 18a of the holding portion 18 first.

The holding portion 18 of the plug 14 is inserted into the fitting portion 16 of the socket 12, the guide portion 26 of the plug 14 is inserted along the slide groove portion 42, and the operation portion 28 moves outside the surface portion 32 of the socket 12. Then, the holding convex portion 22 comes into contact with the stopper 45, which is an end portion of the slide groove portion 42, and is no longer inserted. However, by further strongly pushing in, the surface portion 32 is elastically deformed, a space in the Z-axis direction between the pair of stoppers 45 is widened, the holding convex portion 22 is passed through the space, and the holding convex portion 22 is inserted into the guide concave portion 44. A space in the Z-axis direction between the pair of guide concave portions 44 is wide enough to accommodate the holding convex portion 22. When the holding convex portion 22 is inserted into the guide concave portion 44, the elastic deformation of the surface portion 32 is restored. The holding convex portion 22 is locked by the stopper 45 in a pulling direction, and the plug 14 cannot be pulled out from the socket 12.

As a result, assembly of the socket 12 and the plug 14 is completed, and attachment of the cord stopper 10 to the opening portion of a bag or the like is completed. In a state where the string 46 is inserted into the socket 12 and the plug 14 is assembled, a projection shape in the Z-axis direction, which is the thickness direction of the surface portion 32, of the guide concave portion 44 inside the surface portion 32 is at least partially overlapped with the holding portion 18 of the plug 14. An annular portion of the string 46 along the opening portion extends from the insertion through port 38 of the cord stopper 10, and both end portions 46a of the string 46 extend from the insertion port 36. The operation portion 28 of the plug 14 is positioned outside the surface portion 32 of the socket 12 so as to be parallel to the surface portion 32, and a projection shape of the operation portion 28 on the surface portion 32 is positioned inside an outline of the surface portion 32. The finger place portion 32a of the surface portion 32 of the socket 12 is exposed from the operation portion 28 of the plug 14 at a portion close to the insertion through port 38.

The holding convex portion 22 of the plug 14 is fitted into the guide concave portion 44 of the socket 12 and is slidable between the stopper 45 and the insertion through port 38 in a longitudinal direction of the guide concave portion 44, that is, in the X-axis direction toward the insertion through port 38. The finger place portion 32a of the socket 12 is exposed at a ratio of a length in the X-axis direction of 0.2 to 0.4 to a length of the socket 12 in the X-axis direction even when the plug 14 moves to any slidable position.

When the plug 14 is moved toward the insertion through port 38 of the socket 12, the clamping protrusions 20 of the plug 14 are close to the uneven portions 40 of the socket 12, and the string 46 is held and fixed by being clamped between the clamping protrusions 20 and the uneven portions 40. As shown in FIGS. 3 to 6, when the plug 14 is moved away from the insertion through port 38, gaps between the clamping protrusions 20 and the uneven portions 40 become wider, and the string 46 becomes slidable. Even when the plug 14 is moved away from the insertion through port 38, the holding convex portion 22 of the plug 14 is locked to the stopper 45 of the socket 12 and does not fall out, and the operation portion 28 does not protrude from an end portion of the insertion port 36 side of the socket 12.

Next, a method of using the cord stopper 10 will be described. When the opening portion of the bag or the like on which the string 46 is attached is closed, the finger place portion 32a of the pair of surface portions 32 of the socket 12 is held, and both end portions 46a of the string 46 extending from the insertion port 36 are drawn outward by the other hand. The plug 14 pulled by the string body 46 is separated from the insertion through port 38 of the socket 12, and the string 46 becomes slidable. When drawn out from the insertion port 36 to the outside, the string 46 on the insertion through port 38 side is shortened, and the opening portion is narrowed. When the opening portion is narrowed to a desired state, the pulling out of the string 46 is stopped in this state. In this state, even when a tension for widening the opening portion is applied to the string 46, the plug 14 is pulled into the insertion through port 38 side together with the string 46 by the clamping protrusions 20 of the plug 14, and the string 46 is clamped and fixed by the clamping protrusions 20 of the plug 14 and the uneven portions 40 of the socket 12, so that the string 46 will not be pulled out toward an opening portion side and the opening portion will not widen.

When the opening portion is widened and opened, the operation portion 28 of the plug 14 positioned on the pair of surface portions 32 of the socket 12 is held by one hand and is pulled away from the bag or the like. Thus, the operation portion 28 of the plug 14 is moved away from the insertion through port 38 of the socket 12 with respect to the surface portion 32 of the socket 12, and intervals between the clamping protrusions 20 of the plug 14 and the uneven portions 40 of the socket 12 are widened, and thus the string 46 slidable and is pulled out from the insertion through port 38 and becomes longer, and the opening portion becomes larger, allowing articles to be taken in and out of the bag or the like.

The cord stopper 10 of the present embodiment has a small size and a simple shape and is easily used by a simple operation. In an operation of opening and closing the opening portion of the bag or the like, the finger place portion 32a of the socket 12 can be held together with the operation portion 28 of the plug 14 by one hand, it is not necessary to switch between the time of opening and the time of closing or to separately hold the socket 12 and the plug 14, an intuitive operation is possible, and the operation is easy: The socket 12 and the plug 14 are symmetrical about the central axis in the X-axis direction, so that there is no need to be aware of front and back or left and right, and there is no need to check an orientation in which the socket 12 and the plug 14 are held during operation. The socket 12 is provided with the socket finger hook portion 39 and the plug 14 is provided with the operation finger hook portion 30, so that fingers do not slip during opening and closing operations.

The operation portion 28 of the plug 14 is positioned inside the outline of the surface portion 32 of the socket 12, is compact, and will not be damaged by protrusion. When the operation portion 28 of the plug 14 protrudes toward the insertion port 36 of the socket 12, at the time of closing the opening portion of the bag or the like, the plug 14 may be accidentally pushed into the socket 12, and the string 46 may be locked accidentally, but in the cord stopper 10, since the operation portion 28 of the plug 14 does not protrude from the socket 12, the string 46 is not locked accidentally, and operability is good. Further, the plug 14 is provided with the operation finger hook portion 30 and can be pushed in from the insertion port 36 side of the socket 12 to lock the string 46. Even when the same operation as an existing cord stopper using a metal spring is performed, the string 46 can be locked without any discomfort. Even when not the finger place portion 32a but the side surface portion 34 of the socket 12 is held, an operation of closing the opening portion of the bag or the like is possible.

In the holding portion 18 of the plug 14, the base end portion 18c is positioned between the pair of operation portions 28, and a length of the holding portion 18 protruding from the operation portions 28 is shortened while the holding portion 18 has a sufficient protrusion amount, so that the plug 14 can be downsized into a compact shape. As the plug 14 is reduced in size, the socket 12 can also be reduced in size, and the cord stopper 10 having a small size can be realized. There is no need to use an elastic body, the structure is simple, and a space for accommodating the elastic body is unnecessary. The number of components is two, that is, the socket 12 and the plug 14, which is simple. Since the slide groove portion 42 of the socket 12 is covered by the operation portion 28 of the plug 14, foreign matter such as sand or dust does not enter the slide groove portion 42.

Next, a second embodiment of the present invention will be described based on FIGS. 10 to 14. Here, the same members as those in the above-described embodiment are denoted by the same reference numerals, and the descriptions thereof are omitted. A cord stopper 50) according to the present embodiment is formed of a socket 52 in which the fitting portion 16 through which the string 46 is inserted in one direction is provided inside, and the plug 14 that is inserted into and locked to the fitting portion 16 and presses and holds the string 46 against the socket 52. The plug 14 has the same shape as that of the above embodiment and is integrally molded from a synthetic resin such as polypropylene.

Figure 12:
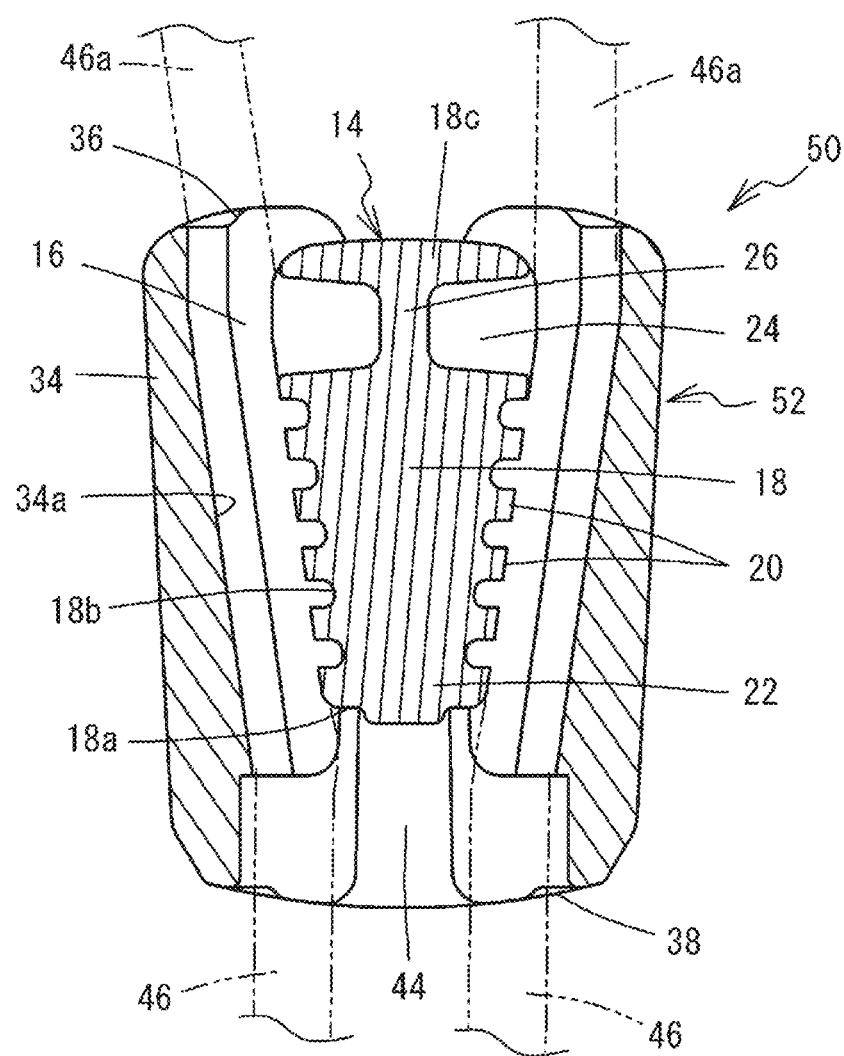
FIG. 12 is a longitudinal cross-sectional view taken along line C-C of FIG. 11B.
Figure 13:
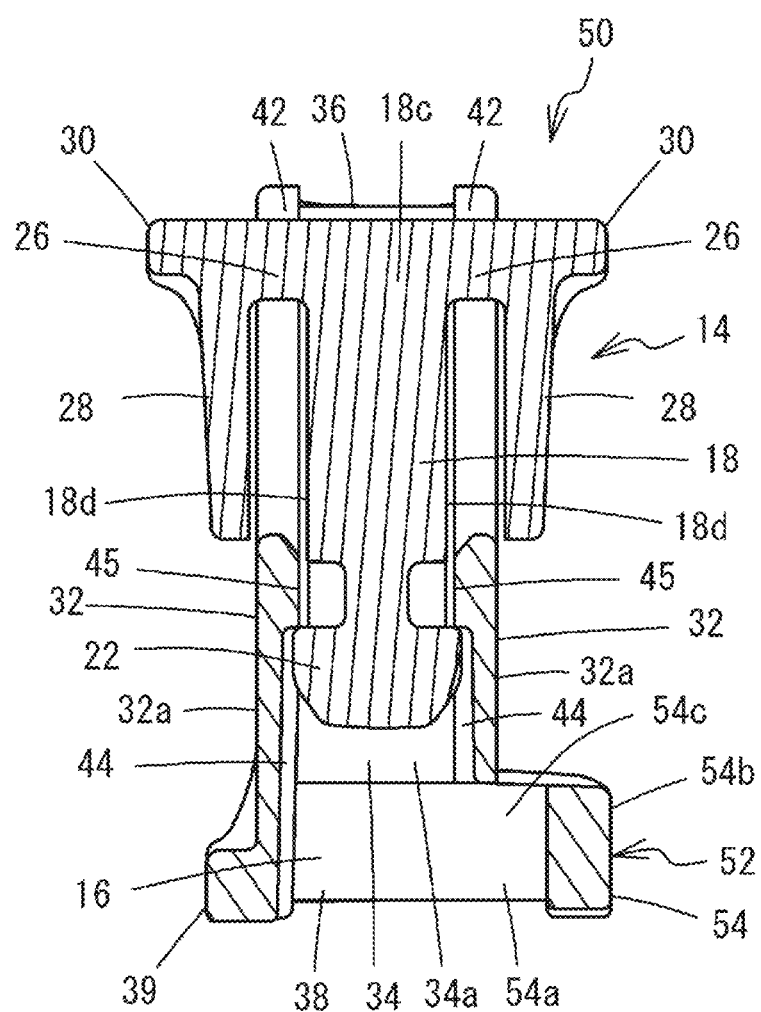
FIG. 13 is a longitudinal cross-sectional view taken along line D-D of FIG. 11C.

Next, the socket 52 will be described. The socket 52 is integrally formed from a synthetic resin such as polypropylene. The socket 52 has the hollow fitting portion 16 into which the plug 14 is inserted. The fitting portion 16 is surrounded by the pair of surface portions 32 facing each other at a predetermined interval and the pair of side surface portions 34 positioned at the side edge portions of the pair of surface portions 32 in the Y-axis direction and facing each other, and is formed into a cylindrical body. As shown in FIG. 12, the fitting portion 16 is the space into which the plug 14 is fitted with some clearance and has the gap between the plug 14 and the fitting portion 16 in which the string 46 is clamped therebetween.

One opening portion of the cylindrical body of the socket 52 is the insertion port 36 into which the plug 14 is inserted and through which the string 46 is inserted, and the opposite opening portion is the insertion through port 38 which holds the string 46, against which the plug 14 is pressed, and through which the held string 46 is inserted. A thickness of the surface portion 32 in the Z-axis direction is approximately constant, and a thickness of the side surface portion 34 in the Y-axis direction is formed to gradually increase from an insertion port 36 side to an insertion through port 38 side. The interval between the inner wall surfaces 34a of the side surface portions 34 gradually narrows from the insertion port 36 to the insertion through port 38. The width of the insertion port 36 in the Y-axis direction is formed larger than the width of the insertion through port 38 in the Y-axis direction. The inner wall surface 34a of the side surface portion 34 is not provided with the uneven portions 40 as the socket 12 of the cord stopper 10 according to the first embodiment.

The one surface portion 32, which forms the insertion port 36, is provided with a tape attachment portion 54. The tape attachment portion 54 has a U-shape that protrudes from the surface portion 32 in the Z-axis direction, linear portions 54a at both ends of the U-shape are flush with the side surface portions 34 and rise in the Z-axis direction at a right angle to the surface portion 32, and a central linear portion 54b is positioned parallel to the surface portion 32. A U-shaped inner space 54c is continuous with the insertion through port 38 without the surface portion 32 extending. Accordingly, the insertion through port 38 is provided with an enlarged width in the Z-axis direction together with the inner space 54c.

Figure 14:
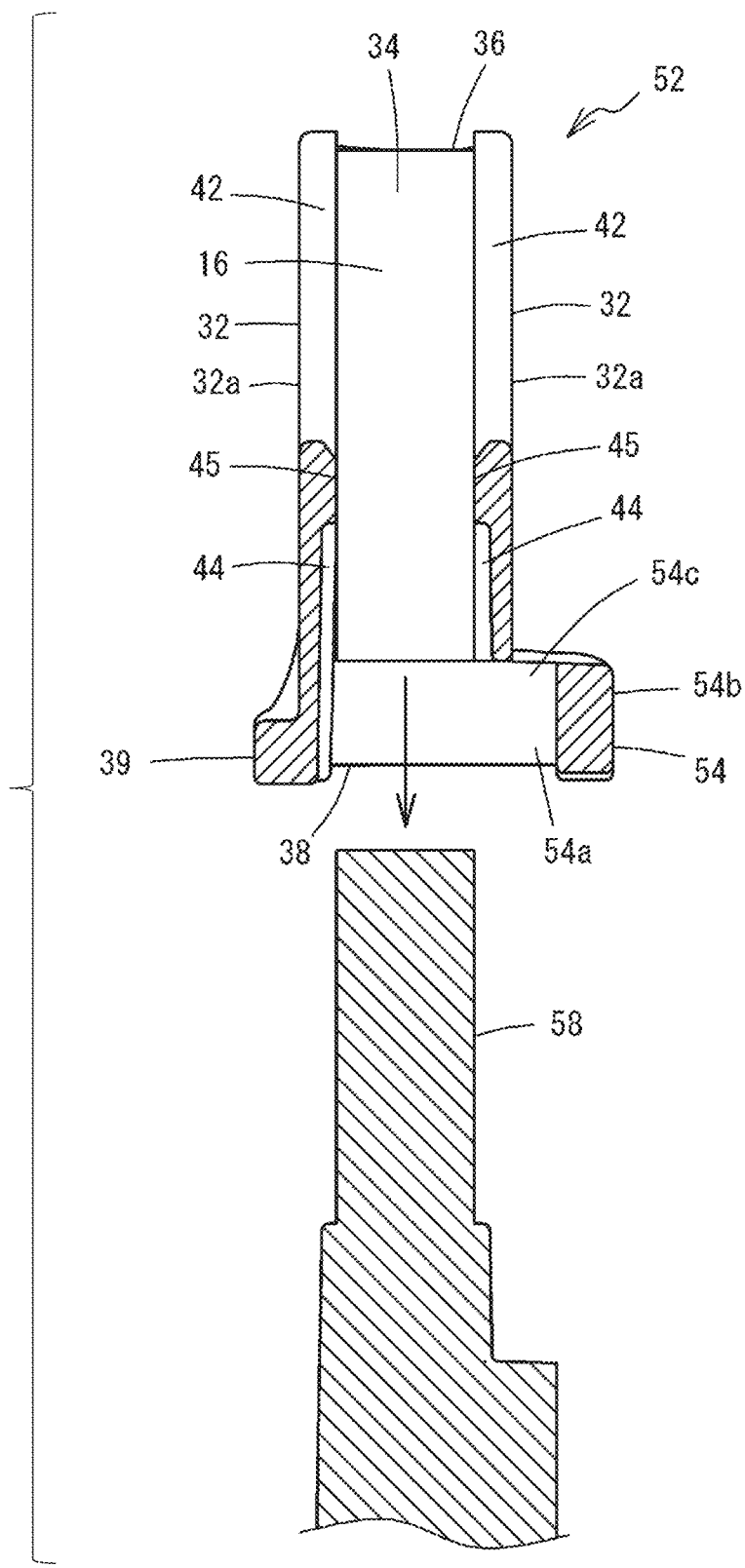
FIG. 14 is a longitudinal cross-sectional view of a socket of the cord stopper according to the second embodiment of the present invention.

The inner wall surface of each surface portion 32 is provided with the guide concave portion 44 having a shape obtained by cutting the thickness of the surface portion 32 into a rectangular shape, and in the surface portion 32 provided with the tape attachment portion 54, the guide concave portion 44 communicates with the inner space 54c continuous with the insertion through port 38. As shown in FIG. 14, since the surface portion 32 does not extend to the tape attachment portion 54, the socket 52 does not require a mold portion for the surface portion 32 of a portion where the inner space 54c is formed and can be integrally molded by a mold 58 having a simple shape.

In a method of attaching the cord stopper 50 to an object to be attached such as a bag, first, before the plug 14 is assembled, a tape member 56 is wound around the linear portion 54b of the tape attachment portion 54 of the socket 52, and an end portion of the tape member 56 is fixed in the vicinity of a hole or the like for passing the string through of an opening portion of a bag or the like. Thereafter, in the same way as the cord stopper 10, in the socket 52, both end portions 46a of the string 46 pulled out from the hole or the like for passing the string through are inserted into the fitting portion 16 from the insertion through port 38 and pulled out to the outside from the insertion port 36.

Next, the plug 14 is inserted between the pair of strings 46 at the center of the insertion port 36 with the tip end portion 18a of the holding portion 18 first. The plug 14 is guided and inserted into the slide groove portion 42 of the socket 52, and the holding convex portion 22 passes through the stopper 45 and is inserted into the guide concave portion 44, so that the plug 14 cannot be pulled out from the socket 52. As a result, assembly of the socket 52 and the plug 14 is completed, and attachment of the cord stopper 50 to the opening portion of a bag or the like is completed.

A method of using the cord stopper 50 is the same as that of the embodiment described above. When the opening portion is opened, by simply holding the pair of surface portions 32 of the socket 12 and the operation portion 28 of the plug 14 by one hand, the string 46 is pulled out from the insertion through port 38 of the socket 52 with a weight of a bag or the like, and the string 46 slides and becomes long, so that the opening portion can be enlarged.

An effect of the cord stopper 50 of the present embodiment is the same as that of the embodiment described above. When the opening portion is opened, by simply holding the pair of surface portions 32 of the socket 12 and the operation portion 28 of the plug 14 by one hand, the string 46 is pulled out from the insertion through port 38 of the socket 52 with a weight of a bag or the like, and the string 46 slides and becomes long, so that the opening portion can be enlarged, which is simple. Since the inner space 54c of the tape attachment portion 54 and the insertion through port 38 are formed in a continuous shape by removing the surface portions 32, the insertion port of the tape member 56 is wide, and the tape member 56 is easily passed. Moreover, a shape of the mold 58 for integrally molding the tape attachment portion 54 can be simplified. Further, the string 46 is also easily inserted.

The cord stopper of the present invention is not limited to the above-described embodiments, the shape of each member can be freely changed, and the material can be appropriately selected. The article to which the cord stopper is attached may be any article such as a bag, a garment, or a cold protection tool.

REFERENCE SIGNS LIST 10, 50: cord stopper
12, 52: socket
14: plug
16: fitting portion
18: holding portion
18a: tip end portion
18c: base end portion
22: holding convex portion
26: guide portion
28: operation portion
30: operation finger hook portion
32: surface portion
32a: finger place portion
34: side surface portion
34a: inner wall surface
36: insertion port
38: insertion through port
39: socket finger hook portion
42: slide groove portion
44: guide concave portion
45: stopper
46: string
54: tape attachment portion

The invention claimed is:

1. A cord stopper comprising:
a socket in which a fitting portion through which a string is to be inserted, is provided; and
a plug configured to press and hold the string inserted into the socket against an inner wall surface of the socket, wherein
the socket is a cylindrical body surrounded by a pair of surface portions facing each other at a predetermined interval and a pair of side surface portions positioned at respective side edges of the pair of surface portions and facing each other, and which is provided with the fitting portion, one of a pair of opposing opening portions of the cylindrical body is an insertion port into which the plug is to be inserted and attached and through which the string is to be inserted, and another one of the pair of opposing opening portions is an insertion through port through which the string is to be inserted, together with the insertion port,
each of the surface portions is provided with a slide groove portion whose one end portion communicates with the insertion port and another end portion reaches a position closer to the insertion through port than to the insertion port at an intermediate portion of the surface portion located along a length of the socket in an insertion direction, an inner surface of the surface portion is provided with a guide concave portion whose one end portion is positioned on a side of the insertion through port and extends toward the slide groove portion and another end portion reaches near the another end portion of the slide groove portion, and a portion between the another end portion of the slide groove portion and the another end portion of the guide concave portion is configured to serve as a stopper,
the plug is provided with a holding portion that protrudes in the insertion direction of the string within the fitting portion, a pair of guide portions that are positioned at a base end portion of the holding portion, intersect a protrusion direction of the holding portion, and protrude toward the pair of surface portions, respectively, and a pair of operation portions that are plate bodies being continuous with tip ends of the guide portions and have surfaces parallel to the protrusion direction of the holding portion,
when the socket and the plug are assembled, each of the operation portions is positioned inside an outline of the surface portion,
the plug is provided with a holding convex portion configured to fit and slide in the guide concave portion at a tip end portion of the holding portion opposite to the base end portion, the holding convex portion is slidable between the stopper and the insertion through port along the guide concave portion, and the pair of guide portions are provided to be movable by fitting into the slide groove portion,
when the plug is moved toward the insertion through port, the string is clamped and fixed between the inner wall surface of the socket and the plug, and
when the plug is moved away from the insertion through port, a space between the inner wall surface of the socket and the plug is widened, and the string is slidable.

2. The cord stopper according to claim 1, wherein
in a state where the string is inserted into the socket and the plug is assembled, a projection shape of each of the operation portions on the surface portion is positioned inside the outline of the surface portion at any position in a direction in which the plug is slidable.

3. The cord stopper according to claim 1, wherein
a portion of each of the surface portions of the socket between the stopper of the end portion of the slide groove portion and the insertion through port is a finger place portion on which a finger is to be placed during operation, and
the finger place portion includes a socket finger hook portion that protrudes from a side edge portion of the surface portion along the insertion through port.

4. The cord stopper according to claim 3, wherein
the guide concave portion on an inner surface of the finger place portion has a projection shape in a thickness direction of the surface portion, which at least partially overlaps with the holding portion of the plug.

5. The cord stopper according to claim 3, wherein
the finger place portion is provided at a ratio of 0.3 to 0.5 with respect to a length of the socket on the insertion direction of the string.

6. The cord stopper according to claim 5, wherein
in a state where the string is inserted into the socket and the plug is assembled, the finger place portion of the socket is exposed from the operation portions at a ratio of 0.2 to 0.4 with respect to the length of the socket in the insertion direction of the string even when the plug is moved to any position at which the plug is slidable.

7. The cord stopper according to claim 1, wherein
the operation portions of the plug have an operation finger hook portion formed at an end portion opposite to the protrusion direction of the holding portion.

8. The cord stopper according to claim 1, wherein
one of the surface portions of the socket, which forms the insertion through port, is provided with a tape attachment portion.

9. The cord stopper according to claim 1, wherein the slide groove portion forms an opening in the surface portion.

* * * * *